April 20, 1926.

H. E. DEPUTY

TRIPLE SEAL PISTON RING

Original Filed Oct. 19, 1922

1,581,484

Witnesses
John T. Anderson

Inventor
Horace E. Deputy

Attorney
Thomas Bilyeu

Patented Apr. 20, 1926.

1,581,484

UNITED STATES PATENT OFFICE.

HORACE E. DEPUTY, OF LONG BEACH, WASHINGTON, ASSIGNOR OF ONE-TENTH TO EARL DAVIDSON, OF PORTLAND, OREGON, AND ONE-FOURTH TO FORREST I. GILL, OF SEATTLE, WASHINGTON.

TRIPLE-SEAL PISTON RING.

Application filed October 19, 1922, Serial No. 595,573. Renewed July 20, 1925.

*To all whom it may concern:*

Be it known that I, HORACE E. DEPUTY, a citizen of the United States, and a resident of Long Beach, in the county of Pacific and the State of Washington, have invented a new and useful Improvement in Triple-Seal Piston Rings and to the method of applying the same to a piston for use in internal-combustion engines and for other purposes, of which the following is a specification.

My invention relates to improvements in the piston ring wherein I have greatly increased the area on the piston side of the ring, and therefore I have in proportion increased the efficiency of the ring in so far as I have lessened the likelihood of the escapement of the compression by leakage past the ring on the piston side of the same and at the same time I have greatly increased the lubricating qualities of the piston ring as applied to the bearing that the same has upon the piston itself. In addition to the above improvements in the ring I have designed a ring wherein it is necessary to turn the piston ring groove in the piston proper in steps or gradations in order to accommodate the piston ring thereto, and when the piston and piston ring have been fitted to each other I have procured a result that makes possible the maintaining of a much higher compression coefficient than is possible because of the greater area and, therefore, the greater distance the leakage must pass in order to escape past the piston ring proper and at the same time escape past an area of increased lubricated surfaces for in my design the construction maintains the oil in place.

To more specifically describe my invention reference is made to the accompanying drawings in which—

Figure 1:
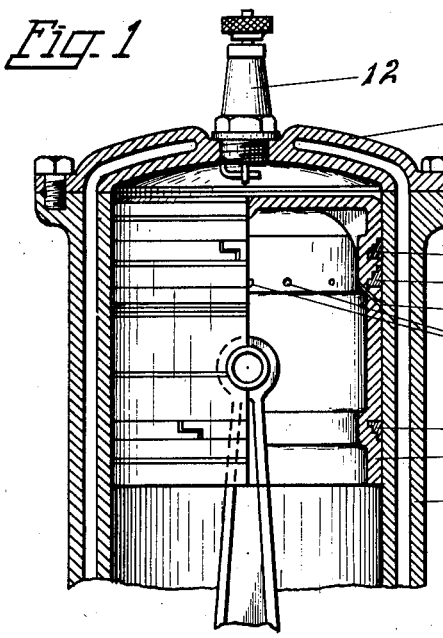
Figure 2:
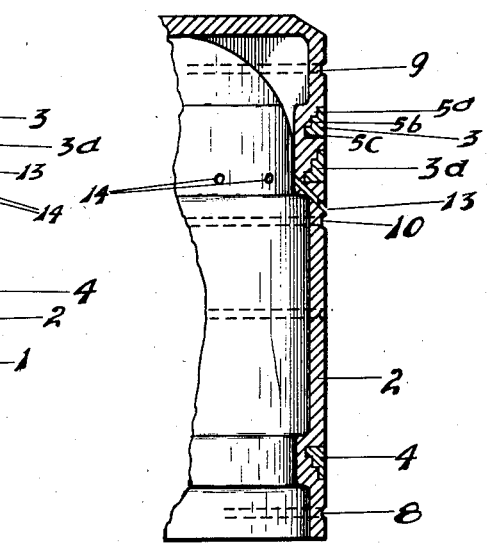
Figure 3:
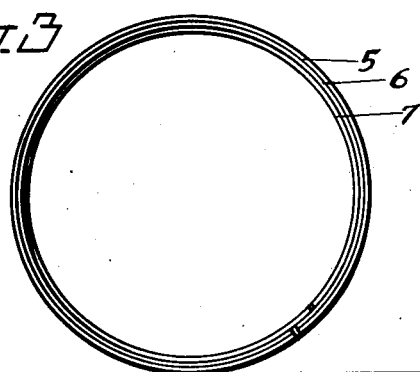
Figure 4:
Figure 5:
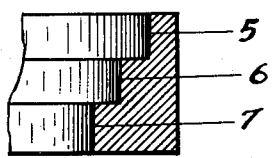

Fig. 1 is a section through the cylinder wall with the piston and rings in place with a partial cross section through the piston and piston rings. Fig. 2 is a partial cross section through one side wall of the piston and clearly showing the piston rings in place in the piston ring grooves and the method of construction of the same. Fig. 3 is a plan view of the detached piston ring, and Fig. 4 is a side view of the joint in the ring the same looking from the inner diameter of the ring. Fig. 5 is an enlarged cross section view of the piston ring showing one side only.

Similar numerals refer to similar parts throughout the several views—

1 is the cylinder of the ordinary type as used in internal combustion engines and the piston and piston rings are here shown in place in an engine cylinder of this type, though I do not wish to be limited to the use of the invention in internal combustion engines as the same may be used for other, and many purposes. 2 is the piston and 3, 3ª and 4 are the piston rings in place in the piston ring grooves and 5, 6, and 7 are steps or offsets turned on the piston side face of the piston ring that are so made and spaced as to conform to similar offsets 5ª, 5ᵇ, and 5ᶜ turned in the piston ring groove turned in the piston. 8, 9, and 10 are grooves or oil rings turned on the outer periphery of the piston, the purpose being to collect an oil seal in the grooves and to further increase the compression that may be created within the compression chamber of the cylinder. 11 is the cylinder head of the engine, and 12 is the spark plug of the same.

As hereinbefore noted the piston ring groove turned in the piston is made up of a series of faces which may be at right angles to each other, while I prefer to make them at right angles to each other and they are so shown in the drawings yet I do not wish to be limited in the patent protection asked for to faces at right angles, for slight modifications may be made to that and yet procure a result that would be greatly in advance over that now generally accomplished by methods and construction most commonly used. The faces cut on the ring must be cut to conform to the angles and distances less a proper clearance as a working fit to those cut upon the piston proper.

While I prefer to place the rings as shown upon the drawings in Fig. 1, namely 3 and 3ª are shown with the large right angle face to the periphery of the ring being on the bottom side and the position reversed in ring 4 yet I do not wish to be limited to this arrangement, and I may prefer to change or rearrange this combination in different uses and under different working conditions.

In Fig. 2 I show an oil groove 13 turned in the piston with oil holes 14 passing from the bottom of the oil groove to the interior of the piston for the passage of the accumulated oil therethrough, this to permit the oil to drain back into the crank case.

It will thus be seen that I have created a piston ring for use in internal combustion engines, and for other purposes, wherein the area of the faces of the ring on the piston side of the same have been greatly increased over the practice in vogue and that I have also increased the area of the faces of the piston ring groove a like amount for the same reason. The ring decreases in area in a direction toward the head of the piston, resulting in a heavier lower edge therefor. When the piston moves downwardly, as a result of the explosion in the cylinder, the lower heavier and stronger end of the ring receives the greater strain and wear, and as this edge of the ring is reinforced, the same will last a greater length of time and will be more efficient in its operation.

Having thus described my invention I wish to make the following claim therefor—

The combination of a ring having a relatively thin section and stepped sections of progressively increasing width providing a plurality of intermediate annular walls in substantially parallel relation and a plurality of concentric walls joining the first mentioned walls, of a piston provided with a groove having walls complementary to the walls of the ring, the intermediately disposed walls of the ring being adapted to coact with the complementary adjacent walls of the groove to eliminate communication between the opposite ends of the groove when fluid pressure is exerted at one end of the groove.

HORACE E. DEPUTY.